(12) United States Patent
Matsumoto et al.

(10) Patent No.: US 9,883,162 B2
(45) Date of Patent: Jan. 30, 2018

(54) STEREOSCOPIC IMAGE INSPECTION DEVICE, STEREOSCOPIC IMAGE PROCESSING DEVICE, AND STEREOSCOPIC IMAGE INSPECTION METHOD

(71) Applicant: PANASONIC CORPORATION, Osaka (JP)

(72) Inventors: Kentaro Matsumoto, Osaka (JP); Yuki Kobayashi, Osaka (JP); Yuki Maruyama, Osaka (JP); Yasunobu Ogura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 868 days.

(21) Appl. No.: 13/904,511

(22) Filed: May 29, 2013

(65) Prior Publication Data

US 2013/0258061 A1  Oct. 3, 2013

Related U.S. Application Data

(63) Continuation of application No. PCT/JP2012/006084, filed on Sep. 25, 2012.

(30) Foreign Application Priority Data

Jan. 18, 2012 (JP) .................. 2012-007624

(51) Int. Cl.
*H04N 13/02* (2006.01)
*H04N 13/00* (2006.01)

(52) U.S. Cl.
CPC ....... *H04N 13/0203* (2013.01); *H04N 13/007* (2013.01); *H04N 13/0011* (2013.01); *H04N 13/0022* (2013.01); *H04N 2013/0081* (2013.01)

(58) Field of Classification Search
CPC ............. H04N 13/0203; H04N 13/007; H04N 13/0011; H04N 13/0022; H04N 2013/0081
See application file for complete search history.

(56) References Cited

U.S. PATENT DOCUMENTS 5,764,871 A   6/1998 Fogel
6,445,363 B1* 9/2002 Urisaka ............................. 345/7
(Continued)

FOREIGN PATENT DOCUMENTS

JP   03-003080   1/1991
JP   09-027969   1/1997
(Continued)

*Primary Examiner* — Tat Chio
(74) *Attorney, Agent, or Firm* — Wenderoth, Lind & Ponack, L.L.P.

(57) ABSTRACT

A stereoscopic image inspection device configured to determine that a stereoscopic image or part of the stereoscopic image is horizontally reversed is provided. A depth obtaining unit obtains depth information of the stereoscopic image. An occlusion detection unit detects an occlusion area of the stereoscopic image. A determination unit evaluates image continuity between the occlusion area and adjacent areas adjacent to the occlusion area, and identifies a first area to which the occlusion area belongs among the adjacent areas based on the evaluated image continuity, and determines whether or not the stereoscopic image has a depth contradiction based on a depth position of the first area included in the depth information.

8 Claims, 9 Drawing Sheets

(56) References Cited

U.S. PATENT DOCUMENTS

| | | | |
|---|---|---|---|
| 8,941,725 B2* | 1/2015 | Moh et al. | 348/51 |
| 2005/0201612 A1 | 9/2005 | Park et al. | |
| 2008/0226159 A1* | 9/2008 | Choi et al. | 382/154 |
| 2008/0278633 A1 | 11/2008 | Tsoupko-Sitnikov et al. | |
| 2008/0291269 A1 | 11/2008 | Hong et al. | |
| 2010/0060720 A1 | 3/2010 | Hirasawa | |
| 2010/0103249 A1 | 4/2010 | Lipton et al. | |
| 2011/0050857 A1* | 3/2011 | Lee et al. | 348/47 |
| 2011/0157555 A1 | 6/2011 | Mashitani et al. | |
| 2011/0211111 A1* | 9/2011 | Mishima et al. | 348/441 |

FOREIGN PATENT DOCUMENTS

| | | |
|---|---|---|
| JP | 10-023311 | 1/1998 |
| JP | 2008-282377 | 11/2008 |
| JP | 2010/021843 | 1/2010 |
| JP | 2011-139339 | 7/2011 |
| JP | 2011-211551 | 10/2011 |

\* cited by examiner

STEREOSCOPIC IMAGE INSPECTION DEVICE, STEREOSCOPIC IMAGE PROCESSING DEVICE, AND STEREOSCOPIC IMAGE INSPECTION METHOD

CROSS-REFERENCE TO RELATED APPLICATIONS

This is a continuation of International Application No. PCT/JP2012/006084 filed on Sep. 25, 2012, which claims priority to Japanese Patent Application No. 2012-007624 filed on Jan. 18, 2012. The entire disclosures of these applications are incorporated by reference herein.

BACKGROUND

The present disclosure relates to stereoscopic image inspection devices for inspecting stereoscopic images and to stereoscopic image processing devices for correcting the stereoscopic images based on results of the inspection.

Japanese Patent Publication No. H03-3080 describes a method for identifying occlusion portions, or the like in obtaining depth information, or the like by comparing images with each other, which are captured by a plurality of cameras, or the like as a stereoscopic image.

SUMMARY

The present disclosure provides a stereoscopic image inspection device for determining the case where a stereoscopic image or part of the stereoscopic image is horizontally reversed.

A stereoscopic image inspection device of the present disclosure includes: a depth obtainer configured to obtain depth information of a stereoscopic image; an occlusion detector configured to detect an occlusion area from at least one of a left-eye image or a right-eye image of the stereoscopic image; and a determiner configured to evaluate image continuity between the detected occlusion area and adjacent areas adjacent to the occlusion area, to identify a first area to which the occlusion area belongs among the adjacent areas based on the evaluated image continuity, and to determine whether or not the stereoscopic image has a depth contradiction based on a depth position of the first area included in the depth information.

Here, the occlusion area refers to an area within an image area common to a left-eye image and a right-eye image, wherein the area is displayed in one of the left-eye image or the right-eye image, but is not displayed in the other of the left-eye image or the right-eye image due to a positional relationship between an object and left and right viewpoints.

Note that in the present disclosure, a meaning that the left-eye image and the right-eye image of the stereoscopic image have been exchanged is expressed in the saying that the stereoscopic image is "horizontally reversed," or that the right and left images of the stereoscopic image are "reversed."

The stereoscopic image inspection device of the present disclosure is capable of detecting the case where a stereoscopic image or part of the stereoscopic image is horizontally reversed.

DETAILED DESCRIPTION

When a left-eye image and a right-eye image are erroneously exchanged in a stereoscopic video signal, the depth of a displayed stereoscopic image is reversed, and thus the displayed stereoscopic image is caused to be very hard to see by a viewer. This is because the left-eye image is viewed by a right eye, and the right-eye image is viewed by a left eye, and thus the depth of the whole image is caused to be unnatural.

Moreover, subtitles which are to be superimposed on the stereoscopic image in an editing process and by a display device may be reversely inserted in the left-eye image and the right-eye image. In such a case, the stereoscopic image in which the subtitles have been inserted partially results in an image containing inconsistency in depth perception (depth contradiction), so that the stereoscopic image is caused to be very hard to see.

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

First Embodiment

[1-1. Basic Configuration]

Figure 1:
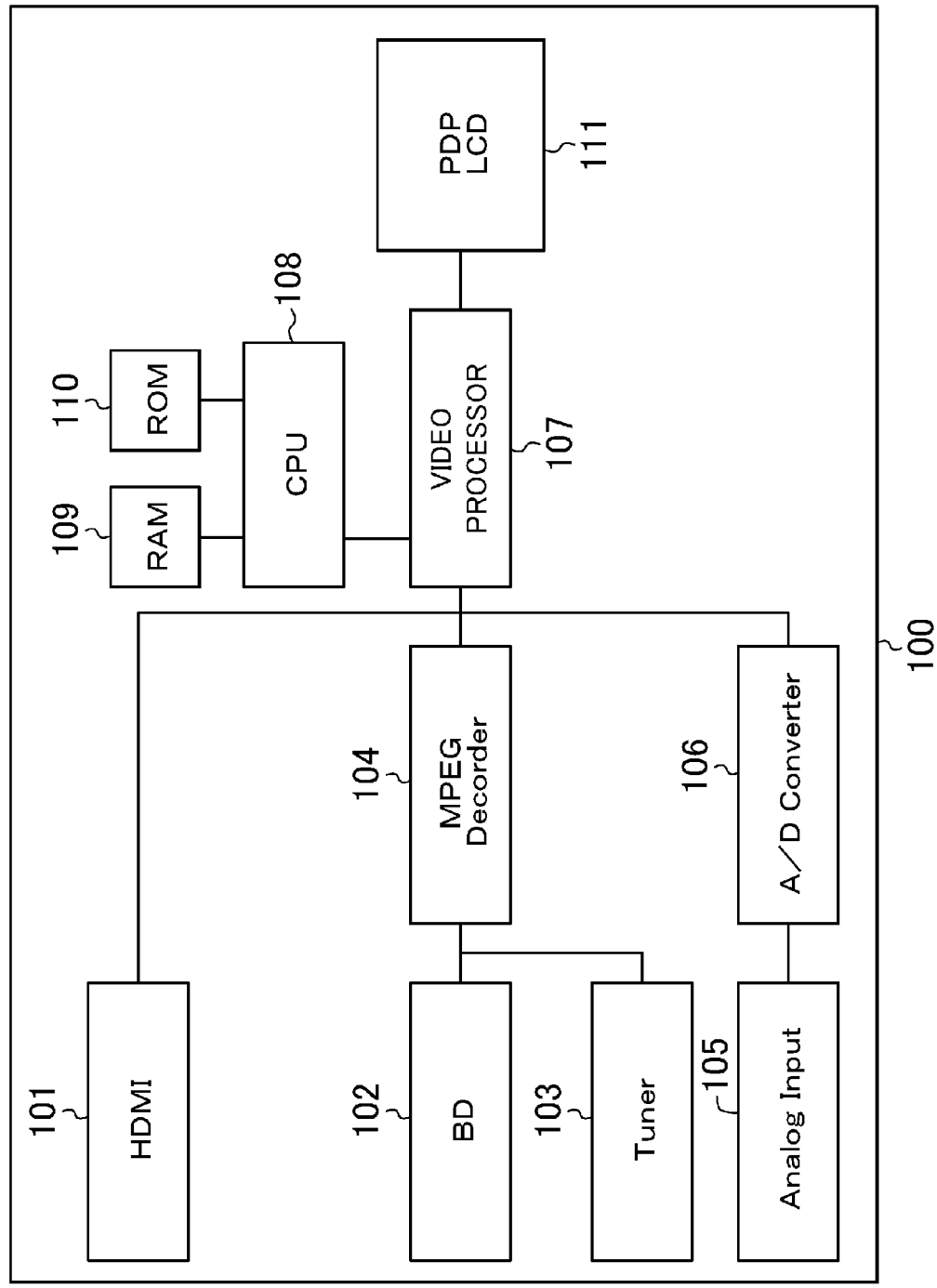
FIG. 1 is a view illustrating an example of a functional configuration of a display device as an example of a stereoscopic image processing device.

FIG. 1 is a display device 100 which is capable of displaying stereoscopic images and is an example of a stereoscopic image processing device. The display device 100 of FIG. 1 includes a HDMI section 101, a BD section 102, a tuner section 103, a MPEG decoder 104, an analog input section 105, an analog/digital converter (A/D converter) 106, an video processor 107, a CPU 108, a RAM 109, a ROM 110, and a display panel 111.

The HDMI section 101 is an input interface to which a video signal, or the like is input via a HDMI cable, or the like form the outside of the display device 100. The BD section 102 is configured to read a video signal from a recording medium such as a Blu-ray disc on which video is recorded. The tuner section 103 is configured to receive a broadcast signal delivered from a broadcast station and a cable television station, demodulates the received signal to extract a desired video signal, and outputs the extracted signal. The analog input section 105 is an interface configured to receive video from the outside of the display device 100 as an analog signal. Note that not all of the HDMI section 101, the BD section 102, the tuner section 103, and the analog input section 105 are necessarily required, and other input units may be provided.

The MPEG decoder 104 is configured to demodulate an encoded video signal input from the BD section 102, the tuner section 103, etc. The A/D converter 106 is configured to convert the analog video signal input from the analog input section 105 to a digital signal.

The video processor 107 is configured to perform various processes on the video signal input from the HDMI section 101, the MPEG decoder 104, the A/D converter 106, etc. Specific processing, etc. will be described later.

The CPU 108 is configured to control the whole display device 100, and in particular, to output various control instructions to the video processor 107 so that a suitable video signal process is executed. The RAM 109 is a memory area used as, for example, a location in which various variables used in executing programs, or the like by the CPU 108 are temporarily held. The ROM 110 is a memory area in which programs, or the like required for operation of the CPU 108 are held.

The display panel 111 displays the video signal processed in the video processor 107 for a user, or the like. Specifically, the display panel 111 can be a plasma display panel (PDP), a liquid crystal display panel (LCD), or the like.

Figure 2:
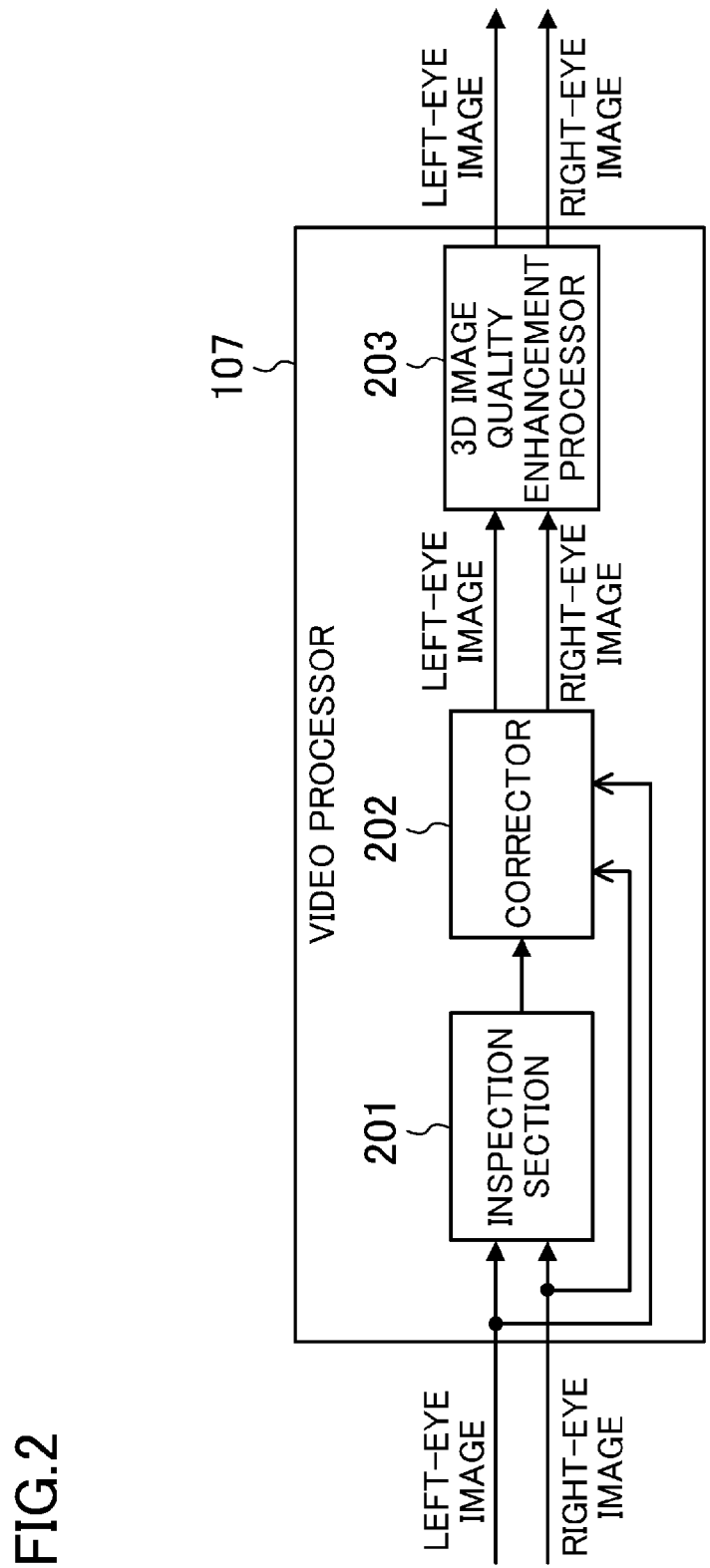
FIG. 2 is a view illustrating an example of a functional configuration of a video processor of the configuration of FIG. 1.

FIG. 2 is a view illustrating a functional configuration in the video processor 107. In FIG. 2, the video processor 107 includes an inspection section 201, a corrector 202, and a 3D image quality enhancement processor 203.

The inspection section 201 determines whether or not an input stereoscopic image has a depth contradiction. The corrector 202 uses a result of the determination by the inspection section 201, and when the stereoscopic image has the depth contradiction, the corrector 202 corrects the stereoscopic image based on a result of inspection, and outputs the corrected stereoscopic image. Specific processing of the inspection section 201 and the corrector 202 will be described later.

The 3D image quality enhancement processor 203 performs an image quality enhancing process on the stereoscopic image to be displayed. Examples of the image quality enhancing process include a noise removal process, a crosstalk cancellation process, a contour enhancement process, a color correction process, etc. The processes by the 3D image quality enhancement processor 203 are the same as those conventionally performed, and thus detailed description thereof is omitted.

[1-2. Configuration and Operation of Inspection Section]

Figure 3C:
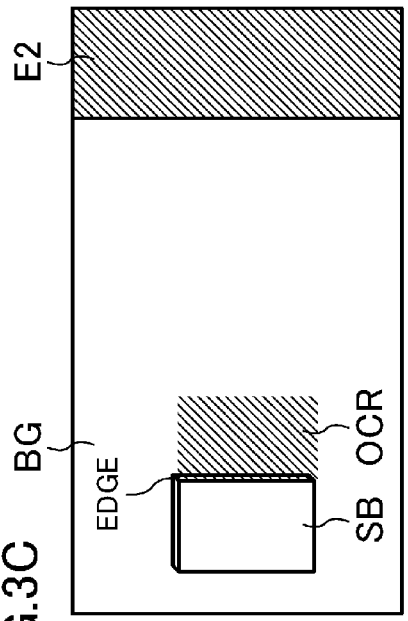
FIGS. 3A-3C are views illustrating occlusion in a stereoscopic image.
Figure 3A:
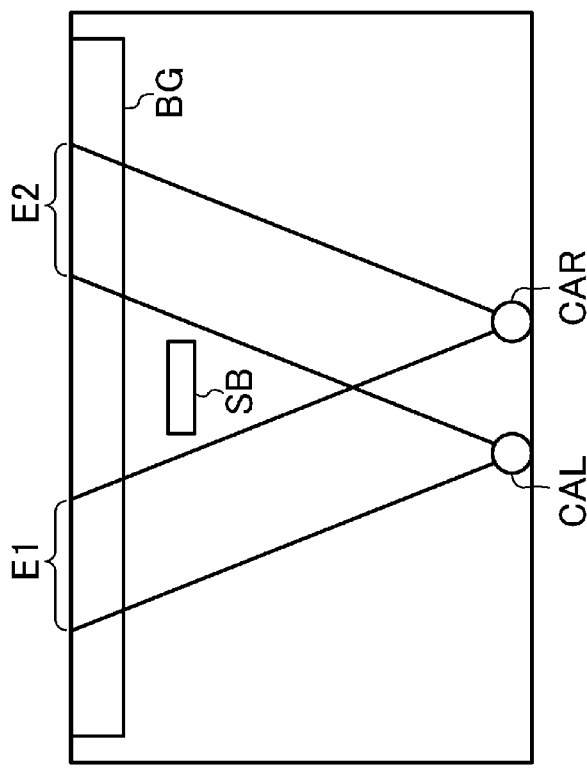
Figure 3B:
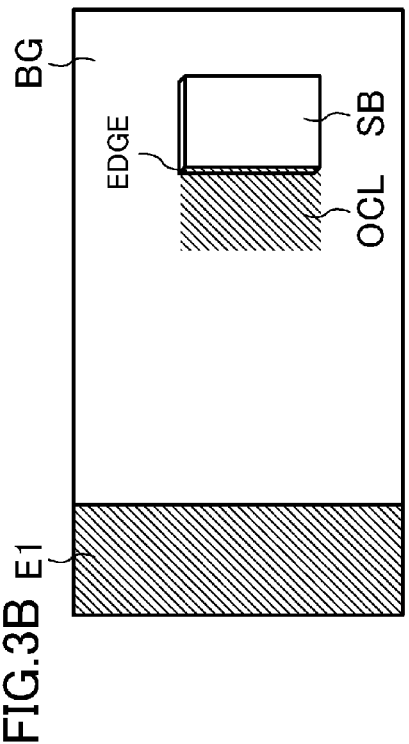

FIGS. 3A-3C are views illustrating occlusion in a stereoscopic image. FIG. 3A illustrates an example of a positional relationship between an object and cameras in capturing the stereoscopic image when viewed from above. In FIG. 3A, a left-eye image capturing camera CAL and a right-eye image capturing camera CAR capture an object SB which is present in front of a background BG. The object SB is a main object of the stereoscopic image, and has a certain dimension in a right-left direction (a direction parallel to a direction connecting the cameras CAL, CAR). Note that the dimension of the object SB in a front-back direction is short, and is satisfactorily small with respect to an object distance.

FIG. 3B is an image captured by the left-eye image capturing camera CAL, and FIG. 3C is an image captured by the right-eye image capturing camera CAR. In FIG. 3B, an area OCL is an area which can be captured only by the left-eye image capturing camera CAL. In FIG. 3C, an area OCR is an area which can be captured only by the right-eye image capturing camera CAR. Although these areas OCL, OCR are areas in an imaging range of both the capturing cameras CAL, CAR, the areas OCL, OCR cannot be captured by the cameras CAR, CAL, respectively because the areas OCL, OCR are hidden behind the object SB due to the positional relationship between the object SB and the cameras CAL, CAR. Such a phenomenon is called "occlusion," and an area in which such a phenomenon emerges is called "occlusion area (blocked area)." Note that an area E1 of FIG. 3B and an area E2 of FIG. 3C are not occlusion areas, but are simply areas which are not included in imaging ranges of the cameras CAR, CAL respectively.

In the present disclosure, the occlusion areas in the stereoscopic image are utilized to determine whether or not the stereoscopic image has the depth contradiction.

Figure 4:
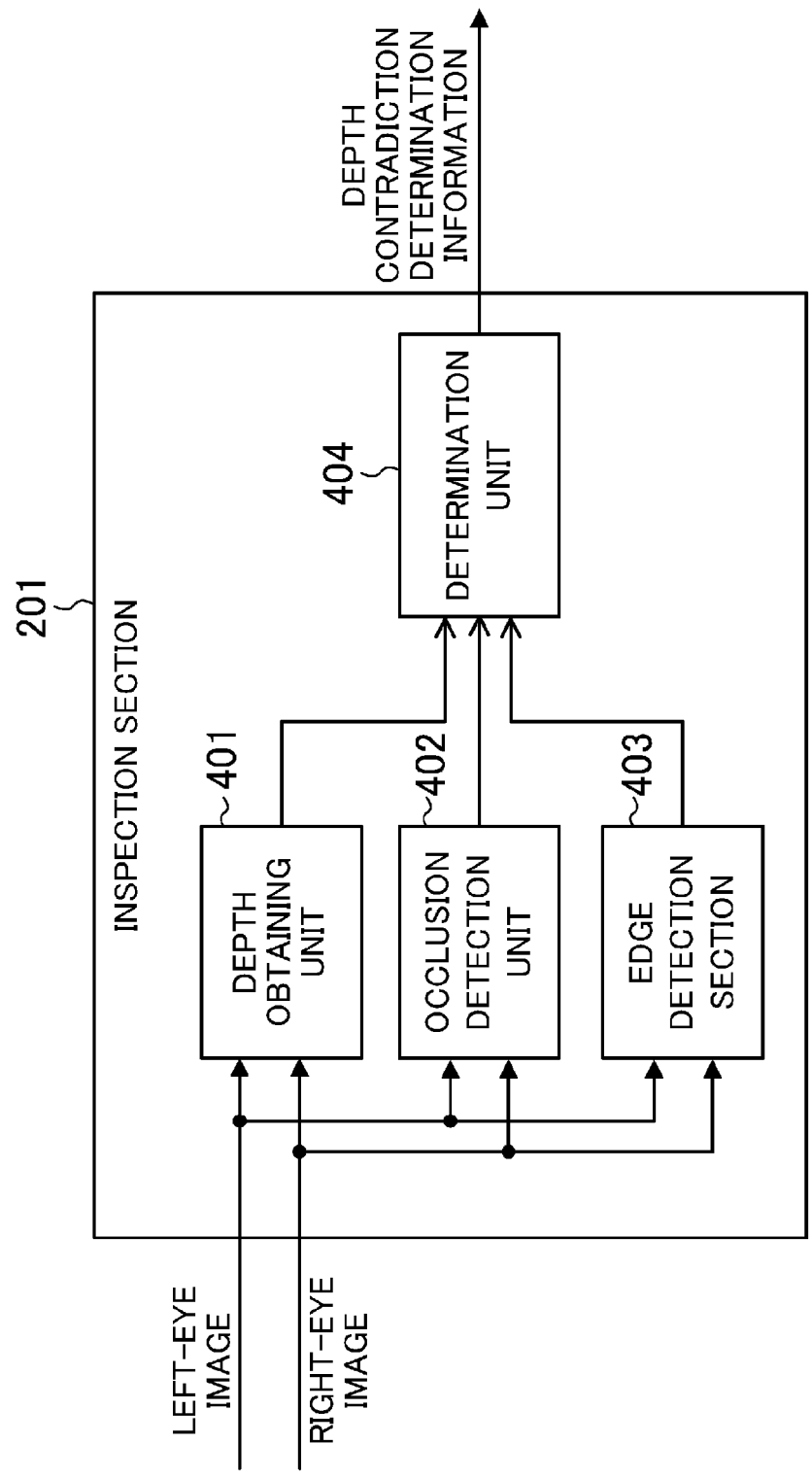
FIG. 4 is a view illustrating an example of a functional configuration of an inspection section in the video processor of FIG. 2.

FIG. 4 is a block diagram of the inspection section 201 in the video processor 107 of FIG. 2. The inspection section 201 includes a depth obtaining unit (depth obtainer) 401, an occlusion detection unit (occlusion detector) 402, an edge detection unit 403, and a determination unit (determiner) 404.

The depth obtaining unit 401 obtains depth information of the input stereoscopic image, and outputs the depth information to the determination unit 404. The depth information indicates a depth position (parallax information) in each of areas of the stereoscopic image. The stereoscopic image usually has parallax in the right-left direction, and thus based on the amount of displacement of each area in the right-left direction, the depth position of the area is identified. Thus, a depth position can generally be obtained based on a correspondence relationship between areas of right and left images. For example, an area (specific area) in the right-eye image corresponding to an area (reference area) in a left-eye image is identified. Based on the position of the reference area in the left-eye image, and the position of the specific area in the right-eye image, it is then possible to determine the depth position of the reference area.

The depth obtaining unit 401 digitizes the depth position (depth) of each area of the object. In digitizing, which depth position is used as a reference is optional. The depth obtaining unit 401 then outputs the depth information representing depth values of the whole image to the determination unit 404. For example, the closer to the front the obtained depth position is, the smaller the value to which the obtained depth position is set, and the closer to the back the obtained depth position is, the larger the value to which the obtained depth position is set, wherein the smaller value is displayed in a blacker color, and the larger value is displayed in a whiter color in the entire display, so that it is possible to obtain a depth image by which the depth positions can be visually recognized.

Note that the method described here is a method for obtaining depth positions of a stereoscopic image, but is not intended to limit the method for obtaining depth positions. For example, when the depth information is delivered together with a stereoscopic image, the depth information may be used as it is.

The occlusion detection unit 402 detects occlusion areas from the right and left images, and outputs information identifying the detected occlusion areas to the determination unit 404. The detection here is performed, for example, in a manner as described below. To detect the occlusion area of the left-eye image, in a manner similar to the above-described method for obtaining the depth positions, a specific area of the right-eye image corresponding to a reference area of the left-eye image is searched. Here, there is an area in which the corresponding specific area is not found. In the example of the FIG. 3B, these areas are the area E1 at the left end and the area OCL. It is previously known that due to the viewpoints of the right and left images, the area E1 is not included in the range of the right-eye image, so that the area E1 is excluded. On the other hand, the area OCL is an area which is included in both the ranges of the right and left images, but is not found in the right-eye image, and appears only in the left-eye image. Such an area is identified as an occlusion area of the left-eye image. In a manner similar to that described above, the occlusion area of the right-eye image can be identified by searching a specific area of the left-eye image corresponding to a reference area in the right-eye image.

Note that the detection of the occlusion areas is not limited to the method described above, but other methods may be used. For example, when the depth information is delivered together with the stereoscopic image, an area in which a depth position is not detected may be determined to be an occlusion area based on the depth information. Moreover, in the method described above, the process of searching a specific area in one image corresponding to a reference area in the other image is common to the detection of the depth position and the detection of the occlusion area. Thus, the detection of the depth position and the detection of the occlusion area may be concurrently performed.

The edge detection unit 403 is configured to extract an edge (contour) in the stereoscopic image from the input stereoscopic image. The edge can be extracted by using DCT, a sobel filter, or the like in conventional methods. The edge detection unit 403 outputs edge (contour) information on the extracted edge in the stereoscopic image to the determination unit 404.

The determination unit 404 determines whether or not the stereoscopic image has the depth contradiction based on the depth information sent from the depth obtaining unit 401, the information identifying the occlusion areas and sent from the occlusion detection unit 402, and the edge information sent from the edge detection unit 403. The determination unit 404 is configured to evaluate image continuity between each of the detected occlusion areas and adjacent areas adjacent to the occlusion area based on the edge information, and identify an area to which the occlusion area belongs among the adjacent areas. Based on the depth position of the area included in the depth information, it is determined whether or not the stereoscopic image has the depth contradiction.

In the example of FIG. 3B, an edge strength (strength of a contour) of the boundary between the occlusion area OCL and the object SB is higher than an edge strength of the boundary between the occlusion area OCL and the background BG. This is because the occlusion area OCL is generally included in the background, and thus is a continuous area in the image, whereas the object SB and the background BG are different objects, and the occlusion area OCL and the object SB have different depth positions. Therefore, the boundary between the occlusion area OCL and the object SB (at a foreground) is discontinuous, and has relatively high edge strength.

Figure 5:
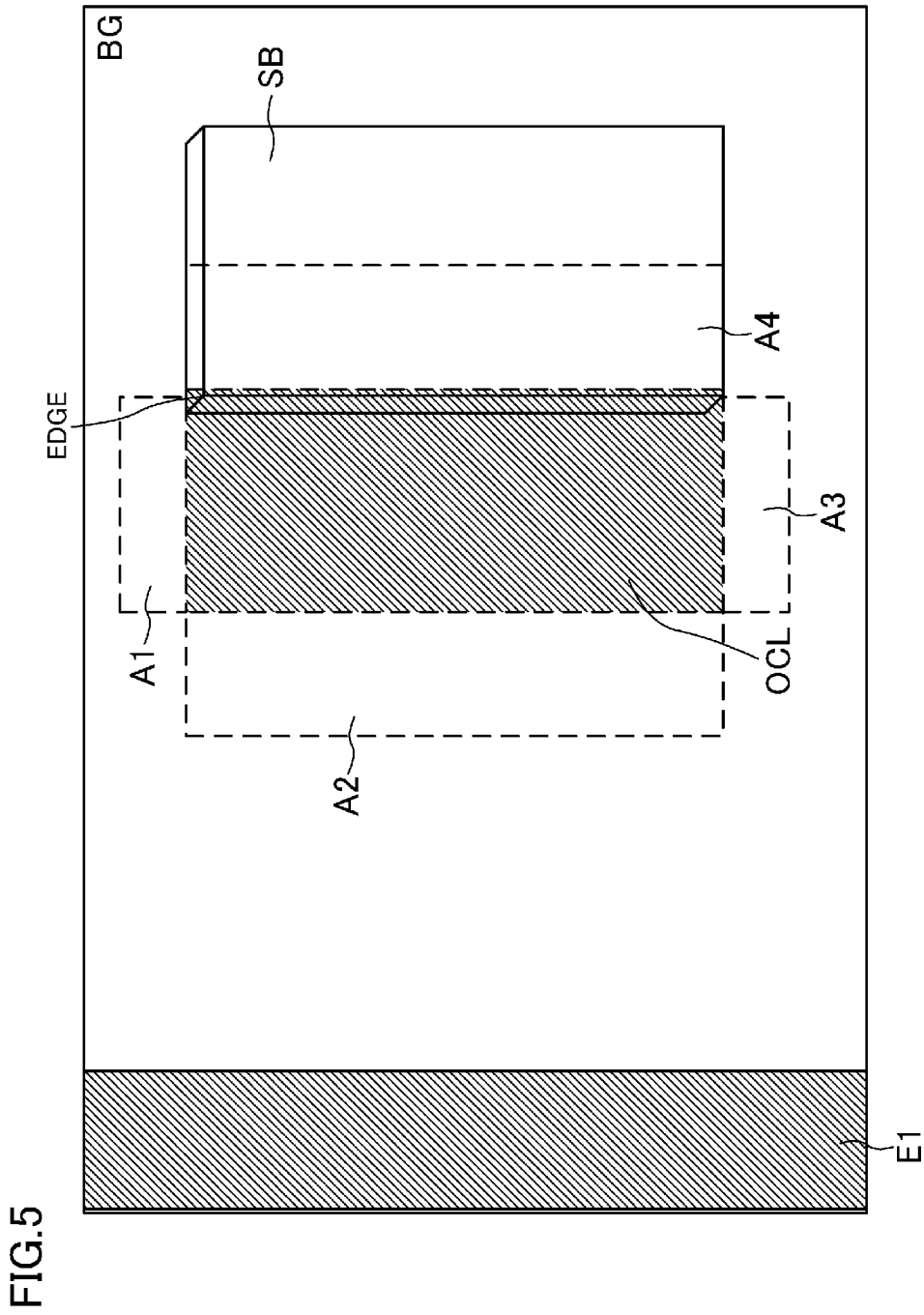
FIG. 5 is a view illustrating a method for evaluating image continuity between an occlusion area and adjacent areas.

FIG. 5 is an enlarged view illustrating a vicinity of the occlusion area in the image of FIG. 3B. With reference to FIG. 5, an example of the process in the determination unit 404 is specifically described. Areas adjacent to the occlusion area OCL are adjacent areas A1-A4. The adjacent areas A1-A4 are adjacent to the occlusion area OCL at top, left, bottom, and right positions, respectively. Based on the edge information, the determination unit 404 determines whether or not a relatively large edge exists in a vicinity of the boundaries between the occlusion area OCL and the adjacent areas A1-A4. Here, it can be seen that a large edge is generated in the vicinity of the boundary between the occlusion area OCL and the adjacent area A4 at the right position. This is because, as mentioned above, the object SB, whose depth position is closer to the front (the foreground) than that of the occlusion area OCL is, exists at the right of the occlusion area OCL. On the other hand, in the vicinity of the boundaries between the occlusion area OCL and the adjacent areas A1-A3, the edge strength is lower than a predetermined value.

From the result, the determination unit 404 determines that the occlusion area OCL does not belong to the adjacent area A4, but belongs to the other adjacent areas A1-A3. It is determined that the depth position of the occlusion area OCL is close to the depth positions of the adjacent areas A1-A3, and is different from the depth position of the adjacent area A4. Here, the image continuity is evaluated for the areas adjacent to the occlusion area OCL at the top, bottom, left, and right positions, but for example, in view of the principle of generation of the occlusion, the image continuity may be evaluated for only the areas adjacent to the occlusion area OCL at the right and left positions. However, for the accuracy of determination, the image continuity is preferably evaluated for a larger area around the occlusion area, inclusive of the areas at the top and bottom positions.

The determination unit 404 reads the depth positions of the adjacent areas A1-A4 from the depth information. When, for example, the depth positions of the adjacent areas A1-A3 to which the occlusion area OCL belongs are at the background, and the depth position of the adjacent area A4 to which the occlusion area OCL does not belong is at the foreground, it is determined that the stereoscopic image does not have the depth contradiction, and thus is normal. In contrast, when the depth positions of the adjacent areas A1-A3 to which the occlusion area OCL belongs are at the foreground, and the depth position of the adjacent area A4 to which the occlusion area OCL does not belong is at the background, it is determined that the stereoscopic image has the depth contradiction, and thus is not normal. In this case, a viewer perceives the stereoscopic image which appears as if the object SB were sunk into the background BG. In such a case, it is assumed that the left-eye image and the right-eye image of the stereoscopic image are reversed.

In the above description, the depth positions are compared with each other between the adjacent area to which the occlusion area does not belong and the adjacent areas to which the occlusion area belongs, thereby determining whether or not the stereoscopic image has the depth contradiction. Alternatively, for example, since the adjacent areas to which the occlusion area belongs are usually close to the background, the depth positions of the adjacent areas to which the occlusion area belongs may be compared with a predetermined threshold value to determine whether or not the stereoscopic image has the depth contradiction.

Note that the process in the determination unit 404 may be performed on any one of the left-eye image or the right-eye image, or may be performed on both the left-eye image and the right-eye image. In the case where the process is performed on both the left-eye image and the right-eye image, for example, the stereoscopic image is determined to be not normal when the depth contradiction is determined in the right and left images, which further increases the reliability of the result of the determination. When the process is performed on any one of the left-eye image or the right-eye image, the load of the process of determination can be further reduced. Note that when the process is performed on any one of the left-eye image or the right-eye image, the occlusion detection unit 402 may detect an occlusion area of one of the images.

Figure 6:
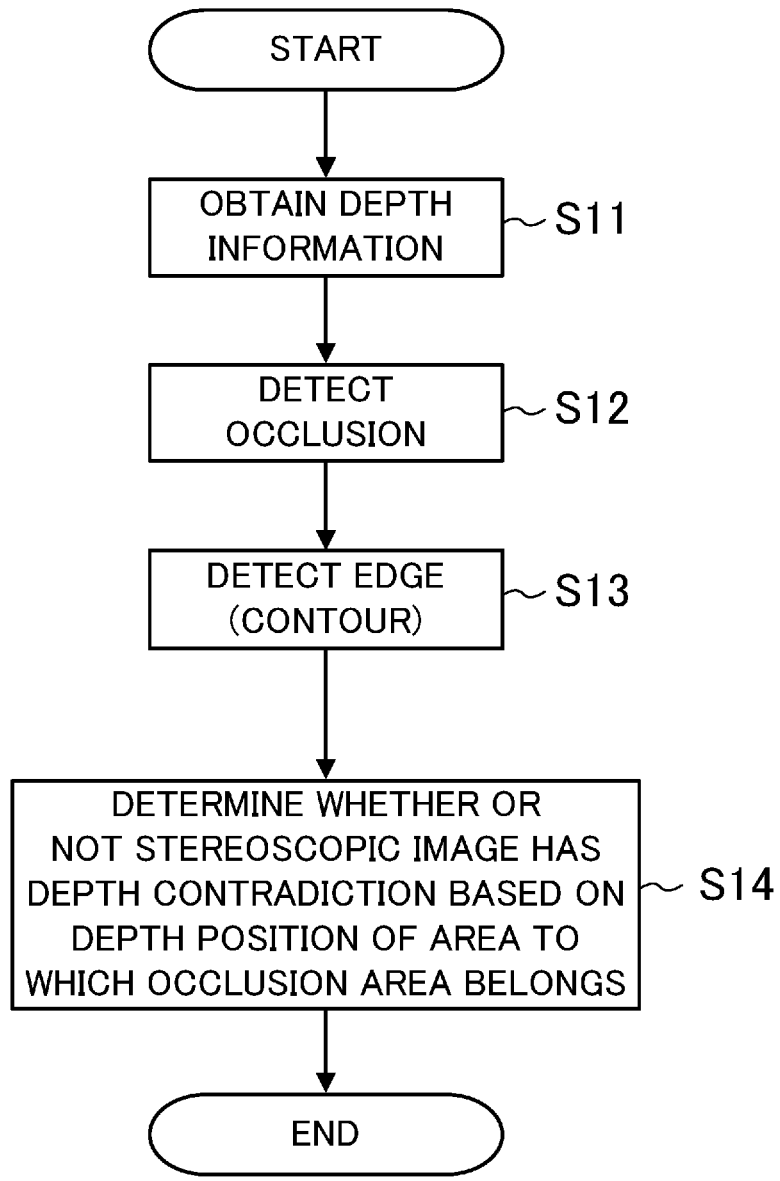
FIG. 6 is a flow chart illustrating an inspection process in an embodiment.

As a result of the process described above, the inspection section 201 outputs depth contradiction determination information. FIG. 6 is a flow chart illustrating a flow of the process described above. Note that the process illustrated in FIG. 6 may be implemented as a program executed by the CPU 108 instead of the video processor 107 of FIG. 1.

(Step S11) Depth information regarding a depth position of an input stereoscopic image is obtained.

(Step S12) Occlusion areas of the input stereoscopic image are detected.

(Step S13) Edges from right and left images of the input stereoscopic image are detected. Note that steps S11-S13 are not necessarily performed in this order, but may be performed in different orders, or may be performed concurrently.

(Step S14) Areas to which the occlusion area belongs are determined based on the depth information, occlusion area information, and edge information, and it is determined whether or not the stereoscopic image has the depth contradiction based on the depth positions of the determined areas.

[1-3. Operation of Corrector]

The corrector 202 corrects the stereoscopic image based on the depth contradiction determination information output from the inspection section 201. For example, when the inspection section 201 determines that the stereoscopic image has the depth contradiction, the corrector 202 reverses the left-eye image and the right-eye image of the stereoscopic image. In this way, the stereoscopic image in which the right and left images have been erroneously reversed can be corrected by detecting the depth contradiction by the inspection section 201, and the corrected image can be output.

[1-4. Advantages]

As described above, in the present embodiment, depth information of a stereoscopic image is obtained, and an occlusion area is detected from at least one of right or left image of the stereoscopic image. Based on edge information, image continuity between the occlusion area and its adjacent areas is evaluated, and areas to which the occlusion area belongs are identified. Based on depth positions of the identified areas, it is determined whether or not the stereoscopic image has a depth contradiction.

Thus, even when the right and left images of the input stereoscopic image have been reversed, it is possible to automatically detect that the right and left images of the input stereoscopic image have been reversed based on the depth contradiction of the stereoscopic image. For the stereoscopic image having the depth contradiction, for example, the right and left images are reversed, and then subsequent processes are performed. Thus, even when the stereoscopic image in which the left and right images have been erroneously reversed, preferable display can be provided to a viewer.

(First Variation)

In the embodiment described above, evaluation of the image continuity between the occlusion area and the adjacent areas is performed based on the edge information. Alternatively, the evaluation of the image continuity can be performed based on other information. For example, luminance information, color distribution information, a frequency component of an image, etc. may be used. Alternatively, the information and the component mentioned above may be used in combination.

Figure 7:
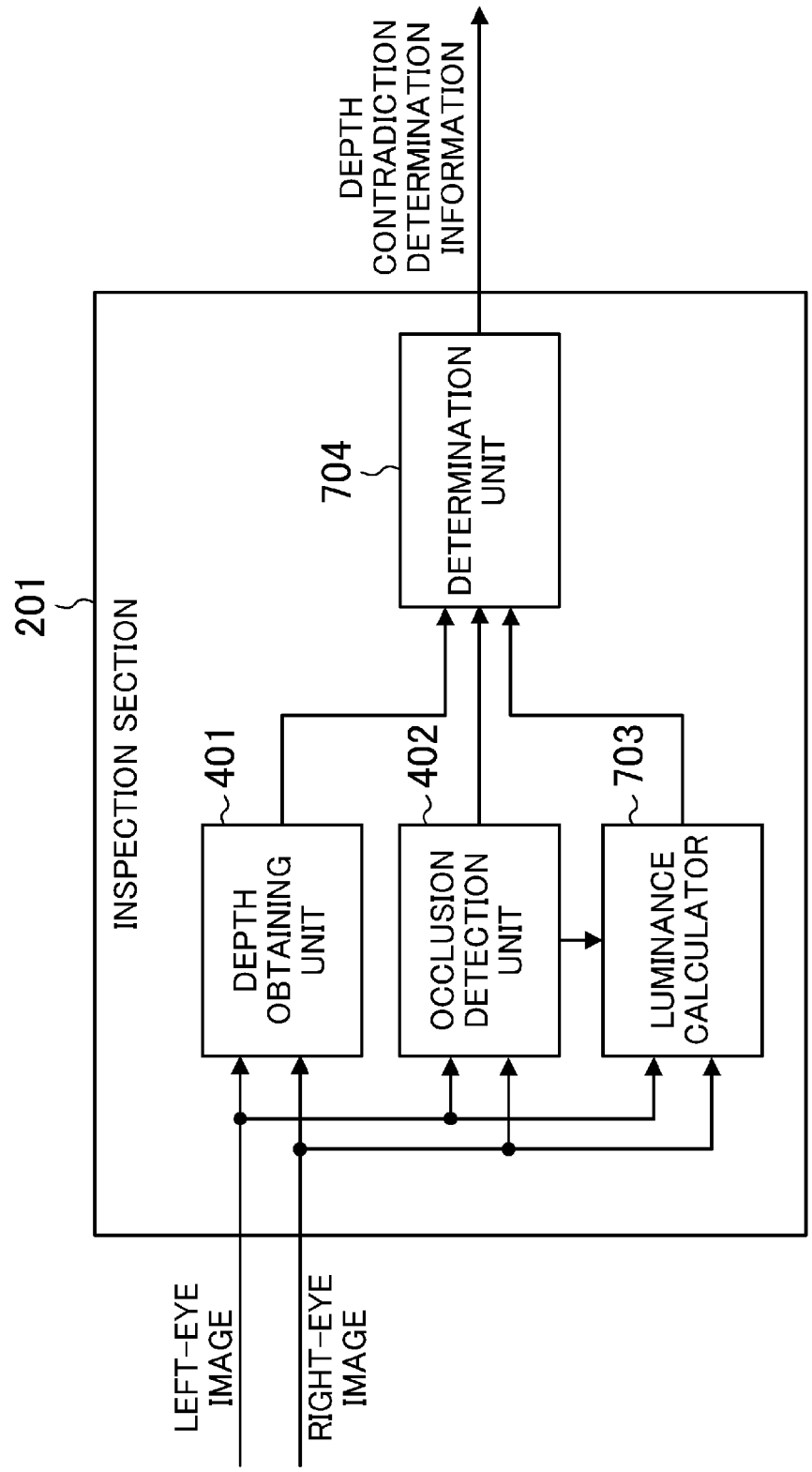
FIG. 7 is a view illustrating another example of the functional configuration of the inspection section in the video processor of FIG. 2.

Here, a method for evaluating the image continuity between the occlusion area and the adjacent areas based on the luminance information will be described. FIG. 7 is a view illustrating a configuration of the inspection section 201 in this case. FIG. 7 is different from FIG. 4 in that a luminance calculator 703 is provided instead of the edge detection unit 403, and a determination unit 704 is provided instead of the determination unit 404.

The luminance calculator 703 computes luminance of an occlusion area detected by the occlusion detection unit 402, and luminance of areas adjacent to the occlusion area. Specifically, for example, average luminance, maximum luminance, minimum luminance, luminance ranges, etc. of the occlusion area and the adjacent areas are computed. The computed values are output as luminance information to the determination unit 704.

Figure 8:
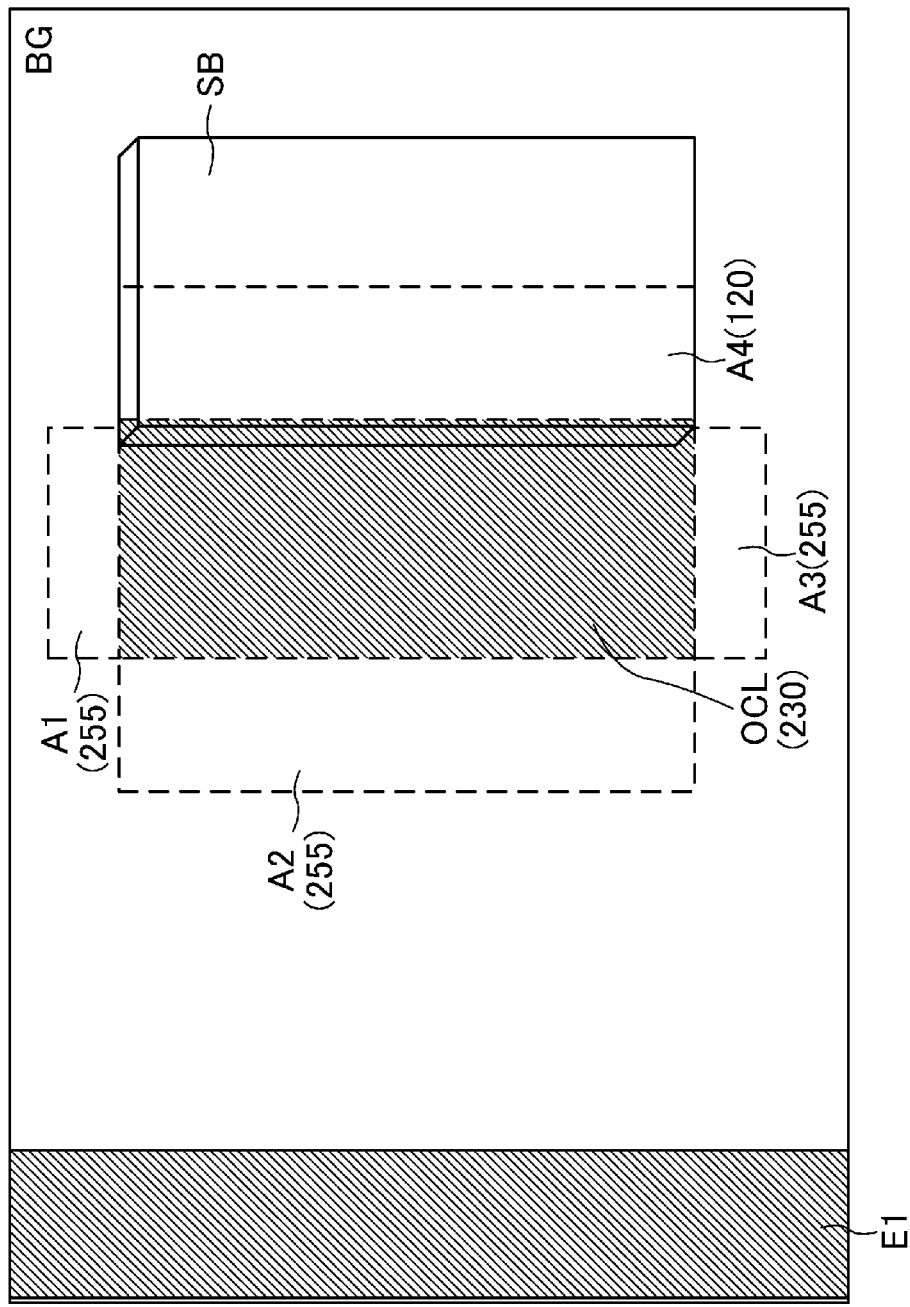
FIG. 8 is a view illustrating another method for evaluating the image continuity between the occlusion area and the adjacent areas.

Based on the luminance information output from the luminance calculator 703, the determination unit 704 evaluates the image continuity between the occlusion area and the adjacent areas. FIG. 8 is an enlarged view illustrating a vicinity of the occlusion area in the image of FIG. 3B. With reference to FIG. 8, an example of the process in the determination unit 704 will be specifically described.

In FIG. 8, for the occlusion area OCL and the adjacent areas A1-A4, average luminance is shown in brackets. The average luminance of the occlusion area OCL is 230, the average luminance of the adjacent areas A1-A3 is 255, and the average luminance of the adjacent area A4 is 120. Based on the average luminance, the determination unit 704 determines that the continuity between the occlusion area OCL and the adjacent areas A1-A3 is high, and the continuity between the occlusion area OCL and the adjacent area A4 is low. Subsequently, in a manner similar to the method described above, whether or not the stereoscopic image has a depth contradiction may be determined based on the depth positions of the adjacent areas A1-A4.

Even when it is difficult to see the edge on the image due to the tones of the object and the background, the shape of the object, etc., there is the possibility that the image continuity in the vicinity of the occlusion area can be more accurately determined based on the luminance. Thus, for example, when the image continuity is evaluated by using a combination of the edge and the luminance, the accuracy of the evaluation is further improved.

(Second Variation)

Although in the embodiment described above, the corrector 202 reverses the left-eye image and the right-eye image of the stereoscopic image when the inspection section 201 determines that the stereoscopic image has a depth contradiction, the process in the corrector 202 is not limited to this.

For example, the corrector 202 may insert alert information in the stereoscopic image when it is determined that the stereoscopic image has the depth contradiction. That is, the stereoscopic image is not corrected, but by using on screen display (OSD), or the like, a viewer can be notified that the stereoscopic image is horizontally reversed. In this case, the corrector 202 may perform the process of reversing the right and left images of the stereoscopic image upon definite operation by a viewer. Thus, in a test stereoscopic image in which the right and left images are intentionally reversed, the right and left images can be prevented from being reversed automatically by the display device 100.

Alternatively, when it is determined that the stereoscopic image has the depth contradiction, the corrector 202 may output any one of the left-eye image or the right-eye image of the stereoscopic image. That is, when the stereoscopic image is horizontally reversed, display of the stereoscopic image is interrupted, and the image may be displayed in a conventional 2D system. In this case, a viewer does not uncomfortably view stereoscopic video, but can view conventional 2D video. Also in this case, by using OSD, or the like, it may be notified that the stereoscopic video is horizontally reversed.

Second Embodiment

In the present embodiment, points different from those of the first embodiment will be mainly described. Repetitive description of elements substantially the same as those in the first embodiment is omitted in some cases.

Figure 9:
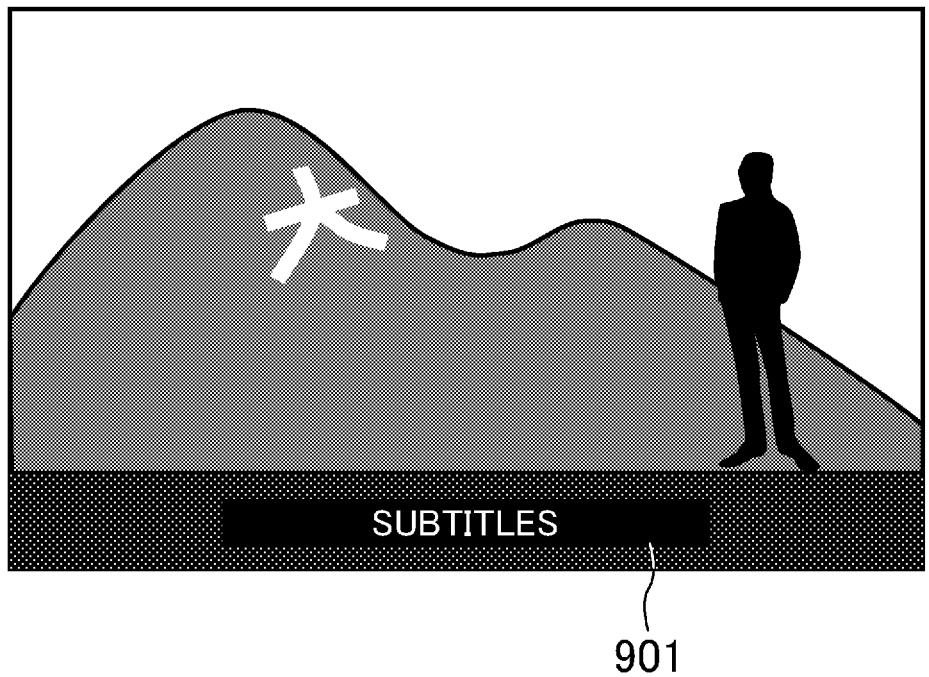
FIG. 9 is a view illustrating an example of a stereoscopic image including additional information.

For example, as illustrated in FIG. 9, a stereoscopic image may include additional information 901 such as subtitles in addition to a captured object. The additional information 901 includes information such as subtitles and Closed Caption inserted in video in a stage of, for example, editing the video after the stereoscopic image is captured. There are cases where the captured and displayed stereoscopic image is normal, but only the additional information 901 such as displayed subtitles is horizontally reversed and has a depth contradiction. To address such cases, in the present embodiment, the stereoscopic image is divided into predetermined areas, and the processes in the inspection section 201 and the corrector 202 described in the first embodiment are performed on an area-by-area basis. For example, right and left images only in areas having the depth contradiction are reversed.

Note that when the display position of the additional information 901 is previously specified, the processes described in the first embodiment may be performed only in the specified position.

Moreover, when only the part of the additional information 901 is horizontally reversed, and the stereoscopic image itself is normal, the corrector 202 may display the part of the additional information 901 in a specific color to notify a viewer that video in the part has the depth contradiction. Alternatively, the corrector 202 may display any one of the right or left image in the part of the additional information 901. Thus, at least this part is displayed as a 2D image, and uncomfortable feeling can be avoided.

Other Embodiment

As described above, the first and second embodiments have been described as example techniques disclosed in the present application. However, the techniques according to the present disclosure are not limited to these embodiments, but are also applicable to those where modifications, substitutions, additions, and omissions are made.

Although in the first and second embodiments, an example has been described where the stereoscopic image processing device according to the present disclosure is implemented as the display device 100 capable of displaying 3D images, the present disclosure is not limited to this. For example, the stereoscopic image processing device according to the present disclosure may be implemented as a recording/reproducing device configured to record/reproduce stereoscopic images. That is, a stereoscopic image processing device may include the inspection section 201 and the corrector 202 as described above, and when an input stereoscopic image has the depth contradiction, the stereoscopic image processing device corrects the stereoscopic image, and outputs the corrected image. Even when a horizontally reversed stereoscopic image is input, the stereoscopic image processing device is capable of outputting a normal stereoscopic image.

Alternatively, it is also possible to implement the content of the present disclosure as, for example, a stereoscopic image inspection device which includes the inspection section 201 described above, and is configured to output a result of inspection on whether or not a given stereoscopic image has depth contradiction. By using the stereoscopic image inspection device, it is possible to easily determine whether or not the stereoscopic image is normal. Combining the stereoscopic image inspection device with the corrector 202 described above provides the stereoscopic image processing device of the present disclosure.

Alternatively, the method described in the first and second embodiments may be implemented as a program processed by, for example, the CPU 108. In this case, the entity of the video processor 107 illustrated in FIG. 1 is implemented as a program, and the program is executed by the CPU 108.

Alternatively, the method described in the first and second embodiments may be performed by a hardware configuration such as a programmable logic device (PLD) and an integrated circuit (IC). In this case, compared to a software program, the process can be performed in a relatively short period of time in many cases.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to stereoscopic image processing devices and stereoscopic image inspection devices configured to detect horizontally reversed stereoscopic images. Specifically, the present disclosure is applicable to TV sets configured to display stereoscopic images, recording/reproducing device configured to record/reproduce stereoscopic images, or the like.

What is claimed is:

1. A stereoscopic image inspection device comprising:
a depth obtainer configured to obtain depth information of a stereoscopic image;
an occlusion detector configured to detect an occlusion area from at least one of a left-eye image or a right-eye image of the stereoscopic image; and
a determiner configured to evaluate image continuity between the detected occlusion area and adjacent areas adjacent to the occlusion area, to identify a first area to which the occlusion area belongs among the adjacent areas based on the evaluated image continuity, and to determine whether or not the stereoscopic image has a depth contradiction based on a depth position of the first area included in the depth information.

2. The stereoscopic image inspection device of claim 1, wherein the image continuity between the occlusion area and the adjacent areas is evaluated based on at least one of contour information, luminance information, color distribution information, or a frequency component of the stereoscopic image.

3. The stereoscopic image inspection device of claim 1, wherein when the depth position of the first area is closer to a foreground than a depth position of a second area is, the determiner determines that the left-eye image and the right-eye image of the stereoscopic image are reversed, where the second area is, among the adjacent areas, an area to which the occlusion area does not belong.

4. A stereoscopic image processing device comprising:
the stereoscopic image inspection device of claim 1, and
a corrector configured to correct the stereoscopic image based on a result of determination by the determiner.

5. The stereoscopic image processing device of claim 4, wherein
when the determiner determines that the stereoscopic image has the depth contradiction, the corrector reverses the left-eye image and the right-eye image of the stereoscopic image.

6. The stereoscopic image processing device of claim 4, wherein
when the determiner determines that the stereoscopic image has the depth contradiction, the corrector inserts alert information in the stereoscopic image.

7. The stereoscopic image processing device of claim 4, wherein
when the determiner determines that the stereoscopic image has the depth contradiction, the corrector outputs only one of the left-eye image or the right-eye image of the stereoscopic image.

8. A method for inspecting a stereoscopic image, the method comprising:
obtaining depth information of the stereoscopic image;
detecting an occlusion area from at least one of a left-eye image or a right-eye image of the stereoscopic image;
evaluating image continuity between the detected occlusion area and adjacent areas adjacent to the occlusion area;
identifying a first area to which the occlusion area belongs among the adjacent areas based on the evaluated image continuity; and
determining whether or not the stereoscopic image has a depth contradiction based on a depth position of the first area included in the depth information.

* * * * *